Nov. 11, 1952 B. C. ANGLE ET AL 2,617,895

ELECTRICAL PHONOGRAPH TRANSDUCER WITH MULTIPLE STYLI

Filed Oct. 5, 1948 2 SHEETS—SHEET 1

Inventors
BELFORD C. ANGLE
MAURICE M. PALO
PAUL VINCENT KELLY

By Frances J. Klempay
Attorney

ELECTRICAL PHONOGRAPH TRANSDUCER WITH MULTIPLE STYLI

Filed Oct. 5, 1948 2 SHEETS—SHEET 2

Inventors
BELFORD C. ANGLE
MAURICE M. PALO
PAUL VINCENT KELLY

By Francis J. Klempay
Attorney

Patented Nov. 11, 1952

2,617,895

UNITED STATES PATENT OFFICE 2,617,895

ELECTRICAL PHONOGRAPH TRANSDUCER WITH MULTIPLE STYLI

Belford C. Angle and Maurice M. Palo, Conneaut, Ohio, and Paul Vincent Kelly, West Springfield, Pa., assignors to The Astatic Corporation, Conneaut, Ohio, a corporation of Ohio Application October 5, 1948, Serial No. 52,854

7 Claims. (Cl. 179—100.41)

This invention relates to sound reproducing apparatus and more particularly to improvements in the mechanical-electrical transducers employed to convert the mechanical undulations in the grooves of a record into electrical pulsations suitable for amplification of a vacuum tube amplifier and reproduction in a speaker. In the general art of sound reproduction various automatic record changing arrangements have been proposed and in one such arrangement the transducer or pickup head is first made to traverse the upper surface of a horizontally disposed and rotating record disc, after which the head is moved upwardly to traverse the lower surface of a second vertically spaced but horizontally disposed and rotating record disc. This mode of operation has heretofore required a complicated and costly pickup head and it is one of the objects of the present invention to provide an improved transducer and stylus assembly which is operative for the purpose aforesaid, but which is nevertheless simple in design, rugged in construction and economical to manufacture.

A lack of standardization in the specifications of record discs has also presented substantial difficulty in the art as, for example, in the case of variation in the dimensions of the record grooves where a stylus having a tip radius of approximately 3 mils is required for one type of record groove and a stylus having a tip radius of approximately 1 mil is required for another type of record groove. Heretofore, if the same reproducing apparatus was to handle either type of record a pair of pick-up arms each having its own stylus and transducer was required. This arrangement is cumbersome and costly and it is accordingly another object of the invention to provide improved and simplified mechanical-electrical transducers, each having a plurality of styli for cooperation with records of different groove dimensions, whereby the same pick-up arm and transducer may be employed for use on the different types of records.

The above general objects are accomplished, in accordance with our invention, by providing an improved pick-up arm, an improved cartridge-like transducer assembly housing the transducer element and mounting a pair of styli which project out of the cartridge housing in opposite directions, and by providing, for use where necessary, an improved quickly detachable mechanical and electrical interconnection between the cartridge and the arm whereby the cartridge may be readily reversed with respect to the arm to present one or the other of the styli to the playing surface of the record as desired.

A further and more specific object of the invention is the provision of improved arrangements for rigidly securing a plurality of oppositely extending styli to a common drive rod of a transducer of the kind used in reproducing phonograph records. A still further object of the invention is the provision in a reversible transducer system having a plurality of oppositely extending record-engaging styli of an arrangement whereby the idle stylus is effectively restrained against oscillation to thereby eliminate the tendency of the driving assembly to resonate at certain frequencies when reached by the record.

The above and other objects and advantages of the invention will become apparent upon consideration of the following detailed specification and the accompanying drawing wherein there is disclosed a certain preferred embodiment of the invention.

Figures 1, 2:
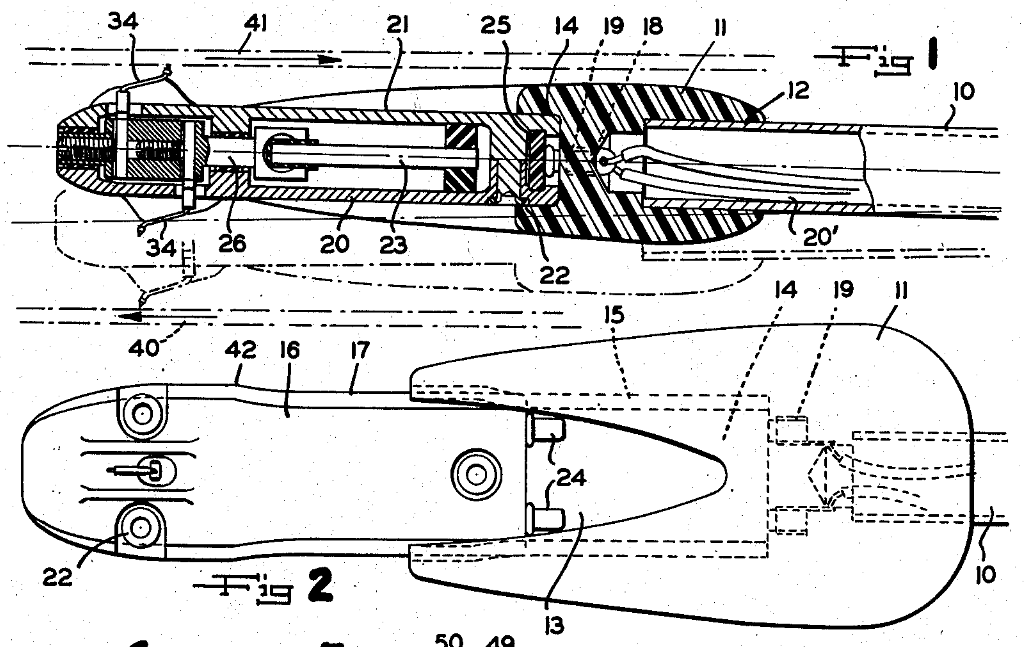
Figure 1 is a side elevation, partly in section, of a combined arm and pick-up cartridge constructed in accordance with the principles of the present invention.
Figure 2 is a plan view of the assembly of Figure 1 but showing the cartridge in partially retracted position.
Figures 10, 11, 12, 13:
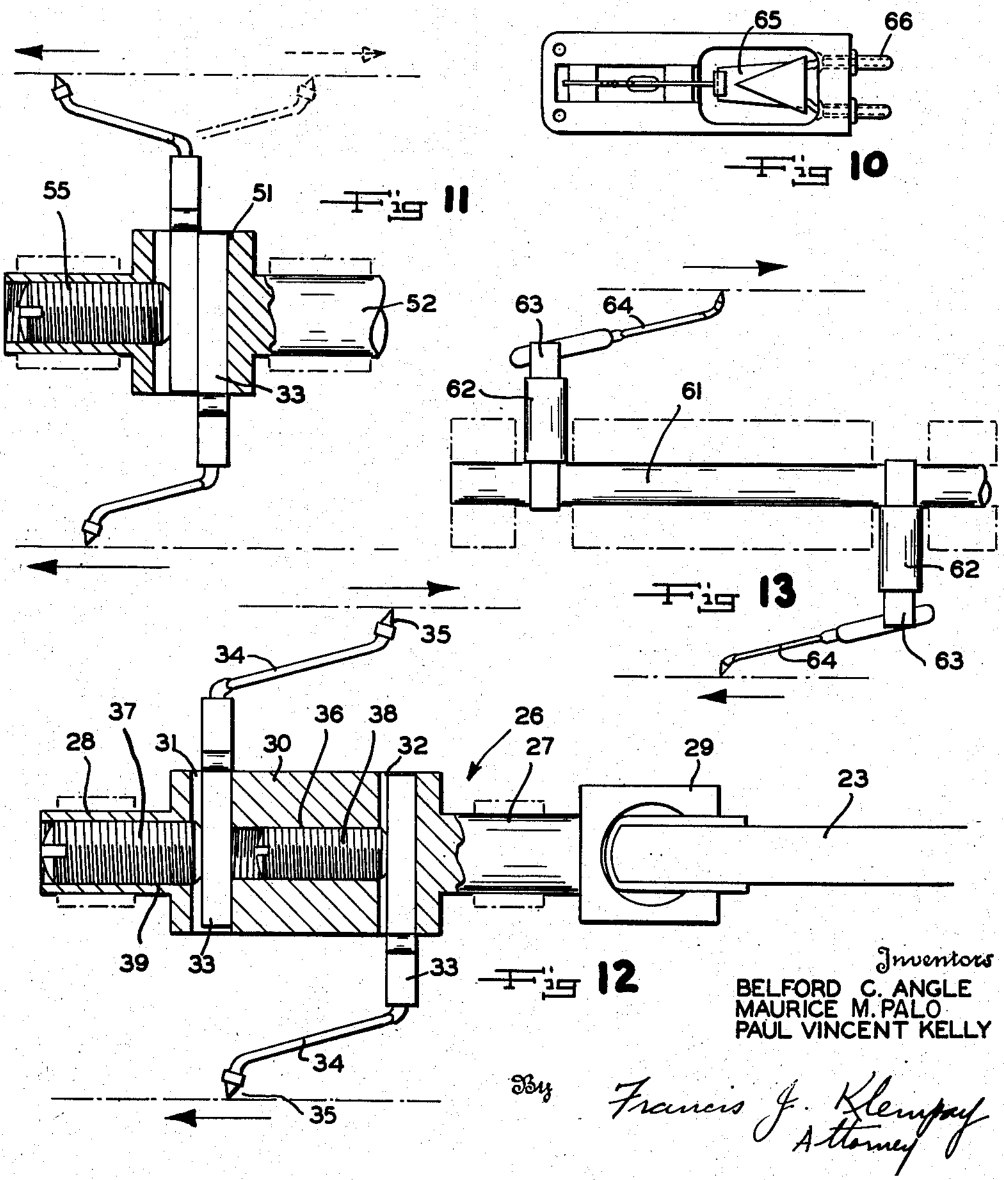
Figure 10 is a plan view of the assembly of Figure 9.
Figure 11 is a fragmentary view, on an enlarged scale, of the drive rod and chuck assembly used in the cartridge of Figure 5.
Figure 12 is a fragmentary view, on an enlarged scale, of the drive rod and chuck assembly used in the cartridge of Figure 1.
Figure 13 is a fragmentary view, on an enlarged scale, of the drive rod and chuck assembly utilized in the cartridge of Figures 6 and 7.

In the embodiment of the invention shown in Figures 1, 2 and 12 the pick-up head carrying arm, commonly termed a "tone arm," consists of a tubular member 10 and secured to the outer or free end of this member is a flat fitting 11 having a socket 12 to tightly receive the end portion of the tube 10. As shown, the fitting 11 is a flat elongated block-like member bifurcated at its outer free end as shown at 13. A socket 14 is formed within the bifurcations with spaced parallel grooved walls 15 for the slidable reception of a cartridge 16 having tapered side walls 17. The slidable interconnection between the cartridge 16 and the fitting 11 is generally illustrated in Figure 4 which shows a similar arrangement for the embodiment of Figure 3, to be later described. Intermediate the sockets 12 and 14 in the fitting 11 is a wall 18 in which is mounted a pair of spaced female electrical connector parts 19 which are electrically connected with conductors 20′ extending through the tube 10. The cartridge 16 is formed of a lower casing section 20 and an upper casing section 21 held together by rivets 22 and enclosing a mechanical-electrical transducing element, preferably a piezoelectric crystal 23. A pair of electrically conducting leads, not shown, interconnect the crystal with a pair of spaced male electrical connectors 24 which are carried on an insulating block 25 clamped in the rear end portion of the cartridge assembly. The alignment of the connector elements 19 and 24 and the guides 15 is such that upon the cartridge being fully inserted in the fitting 11 electrical connection is automatically established between the output leads of the crystal 22 and the flexible conductors 20′. This relation holds true regardless of whether the casing section 20 or 21 is in uppermost position when the cartridge is moved into the fitting 11.

Journaled within the casing provided by the sections 20 and 21 is a drive rod 26 for the crystal 23 and since this driving assembly is shown more in detail in Figure 12 specific reference is now made to said Figure 12. Drive rod 26 is an integral member having a pair of spaced aligned and rounded sections 27 and 28 for reception in the journals in the cartridge housing and having an end clamp 29 for clamping onto the free end of the crystal 23. Thus, the crystal 23 will be flexed torsionally upon rocking movement of the drive rod 26, all in accordance with usual practice.

The rod 26 is enlarged intermediate the portions 27 and 28 as shown at 30 and there is provided in such enlargement a pair of spaced vertically extending bores 31 and 32 to receive the shanks 33 of a pair of record engaging styli associated with the assembly. As shown, each stylus consists of a heavy shank member (33) which is received in the apertures 31 or 32, an angularly related flexible body portion 34 carrying an offset record engaging tip 35 at its outer or free end.

A hole is bored inwardly from the end of rod 26 opposite the clamp 29 and the portion 36 of such hole which is within the enlargement 30 is of considerably smaller diameter than is the portion 37 of such hole which is within the portion 28 of the rod. Both the hole portions 36 and 37 are threaded and by reason of the difference in their diameters a smaller set screw 38 may be inserted to clamp a stylus shank in the aperture 32, after which the shank of a second stylus may be inserted in the aperture 31 and rigidly secured therein by a larger set screw 39 threaded in the hole portion 37.

Referring back to Figure 1, it will be noted that the pick-up is illustrated in connection with a lower record disc 40 and an upper record disc 41 which in some reproducing apparatus move in opposite directions, as indicated. To allow for proper stylus tracking of first the lower record and thereafter the upper record or vice versa without reversing the cartridge in the fitting 11 the slanting of the styli 34 is in opposite directions as illustrated, but it should be observed that the spacing of the stylus receiving apertures 31 and 32 allows an identical effective mechanical interrelation to be maintained in the line of drive from either record 40 or 41 while yet employing identical styli assemblies. As shown in Figure 1, the casing sections 20 and 21 are provided with relatively off-set stylus receiving apertures and stylus guards to accommodate the off-set nature of the stylus mountings.

If desired, the casing with cartridge 16 may be widened slightly as shown at 42 in Figure 2 so that as the cartridge is slid into the fitting 11 and is almost to its fully operative position the gradual enlargement 42 will tend to force apart the bifurcations of the fitting 11, thereby frictionally retaining the cartridge 16 in the fitting 11. In practice, the fitting 11 will normally be molded from plastic material and the cartridge casing sections 20 and 21 may be similarly produced or die cast, depending on the manufacturer's preference. If the assembly is to be employed in the manner now to be described it is desirable that the two halves of the cartridge casing employed be of different color or be otherwise marked so that a user can tell at a glance which of the two styli of the assembly is in downward position.

The general assembly of Figures 1 and 2 may also be employed for selective use with records of different recording specifications. Thus, one of the styli 34 may be provided with a much smaller tip radius to play records having recording grooves of smaller dimension and be rotated in its socket 180 degrees in the manner shown in Figure 3. With the cartridge and styli so prepared the same cartridge and arm may be employed to reproduce either type of record, it being only necessary to turn the cartridge over in the fitting 11 in changing from one type of record to another.

Figure 3:
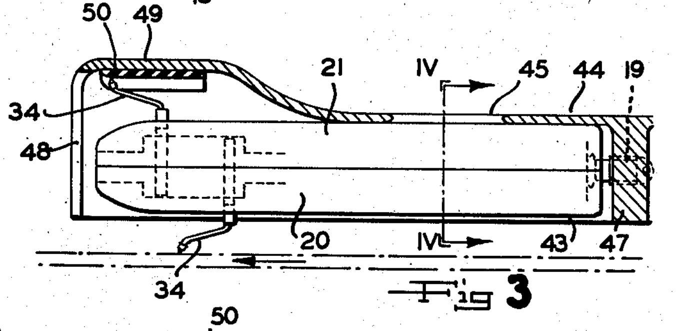
Figure 3 is a vertical section through a modified form of arm constructed in accordance with the invention and showing in elevation a transducer cartridge embodied therein.
Figure 4:
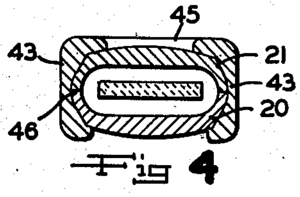
Figure 4 is a transverse sectional view taken along the line of IV—IV of Figure 3.

Figures 3 and 4 illustrate a modified form of arm which may be employed with the cartridge and styli of Figures 1 and 2 when the latter are oriented and prepared for use with different types of records as explained. The arm of Figures 3 and 4 is an inverted channel-like member having side walls 43 and a top wall 44 in the latter of which is formed an aperture 45 so that an operator may readily determine by inspection which of the two casing sections 20 or 21 is in uppermost position, this being an indication of which stylus is in depending position, as the casing sections are differently colored or otherwise marked with suitable identification. The arm comprised of the walls 43 and 44 is produced by molding a casting and in the process thereof grooves 46 are formed in the inner surfaces of the side walls 43 to snugly receive the cartridge casing in a sliding fit, as will be understood. Spanning the walls 43 at a point spaced rearwardly of the position normally occupied by the cartridge is a wall 47 in which is mounted, in suitable insulating relation, the pair of female electrical connectors 19 for cooperation with the connecting prongs 24 of the cartridge assembly. To allow the cartridge to be readily slid out of the arm the front end of the arm is open as at 48.

In pick-up systems employing a pair of styli only one of which is in use at one time, while both are connected to a common transducer drive, there is a tendency for the mechanical drive to resonate due to the moment arm of the idle stylus. We have found that this tendency can be entirely eliminated without appreciably lowering the extent or flatness of the transducer response by yieldably restraining the tip of the idle stylus against motion. In the embodiment of Figure 3 we accomplished this object by raising the top wall 44 of the tone arm at its outer free end as shown at 49 and by securing to the underside of this raised portion 49 a strip of soft rubber 50 into which the tip of the idle stylus is embedded upon the cartridge being inserted in the arm.

Figure 5:
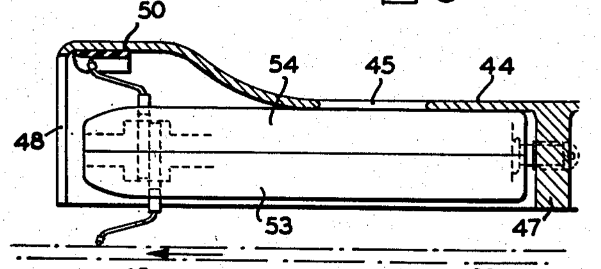
Figure 5 is a longitudinal section through another modified form of arm.

The cartridge and stylus assembly of Figure 3 has the disadvantage of spacing one of the stylus tips further from the pivot point of the arm than the other of the stylus tips. To provide for the substantial equal spacing of the two stylus tips from the arm mount while yet enabling identical styli to be employed we may utilize the structure of Figures 5 and 11 wherein the crystal drive rod is fore-shortened and provided with a single enlarged aperture 51 adapted to receive a pair of styli shanks 33 in side by side relation. The drive rod, shown at 52 has a pair of closer spaced round portions which are received in suitable journals formed in a modified type of cartridge casing having a lower casing section 53 and an upper casing section 54. The outer end of the rod 52 is drilled and tapped to receive a single set screw 55 which operates to clamp both the stylus shanks in the aperture 51. With the styli arranged as shown in full lines in Figures 5 and 11 and with one of them provided with a smaller tip the apparatus may be readily employed to selectively play records having different recording systems as outlined above, it being only necessary to reverse the position of the cartridge in the arm in changing from one type of record to another. However, upon the cartridge of Figures 5 and 11 being mounted similarly to the cartridge of Figures 1 and 2 and with both styli identical and positioned as shown in full lines the assembly may be employed in automatic record-playing equipment where both of a pair of vertically spaced records rotate in the same direction. If one of the pair rotates in an opposite direction it is a simple matter to reverse one of the styli to a position as shown in dotted lines in Figure 11.

Figures 6, 7:
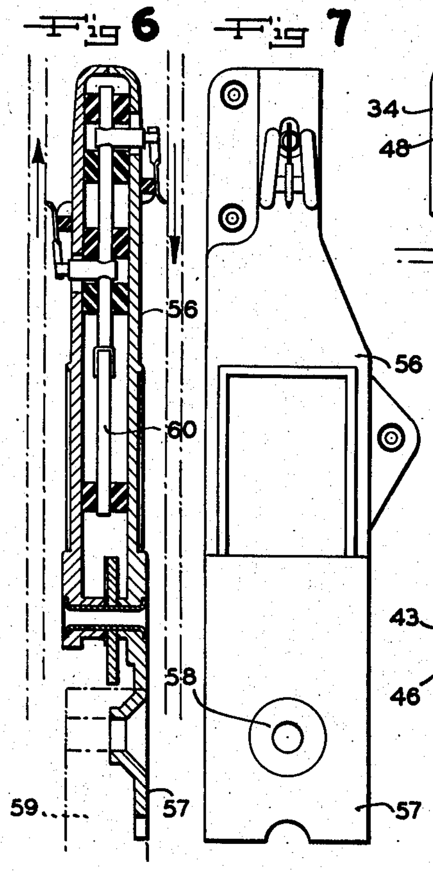
Figures 6 and 7 are sectional and plan views, respectively, of a modified form of cartridge constructed in accordance with the principles of the invention.

In the embodiment of the invention illustrated in Figures 6, 7 and 13 a separate casing for the transducer cartridge is not employed, but, rather, one of the casing sections for the transducer cartridge itself, as the section 56, for example, is elongated as shown at 57 and provided with an integral mounting ferrule 58 for attaching the cartridge to an arm 59. In this embodiment the drive rod for the transducer crystal 60 consists of a round elongated member 61 which is journaled in suitable spaced rubber bushings secured in the cartridge casing sections and as shown more clearly in Figure 13 there is rigidly attached to the rod 61 in longitudinally spaced and radially opposite extending directions a pair of sockets 62 arranged to detachably receive the shank 63 of a pair of styli 64. By properly selecting the spacing of the socket 62 and the length of the stylus members 63, 64 the same styli tips can be made to be directly opposite each other so that the effective distance between the pivot point of the arm 59 and either of the styli tips will be the same. With the styli arranged as indicated the assembly is operative to play both sides of a number of records in sequence as will be understood by those familiar with automatic sound reproducing apparatus.

Figure 8:
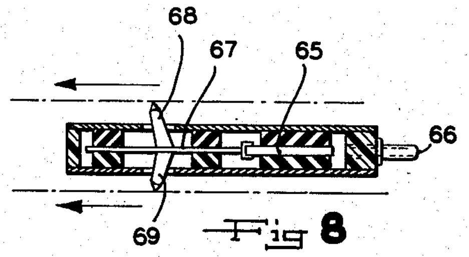
Figures 8 and 9 are longitudinal sectional views of two modified forms of pickup cartridges.

Figure 8 illustrates a simplified form of transducer cartridge having a pair of permanently attached styli for use with different type records in which case the styli tips will have different dimensions, or for use with automatic record players in which the playing surface of spaced records move in the same direction. The piezoelectric crystal is shown at 65, the electrical connecting prongs at 66, and the drive rod at 67. To the drive rod 67 is permanently attached, by welding or otherwise, the stylus tip carriers 68 and 69.

Figure 9:
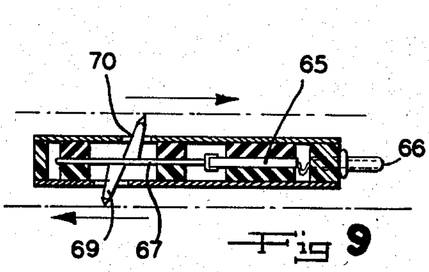

Figures 9 and 10 illustrate an embodiment generally similar to Figure 8 but differing therefrom in that one of the styli (70) is slanted in a rearward direction whereas both the styli of Figure 8 are slanted in a forward direction. It should be apparent that the assembly of Figure 9 is operative to track the adjacent playing surfaces of a pair of spaced parallel record discs which rotate in opposite directions.

It should now be apparent that we have provided improved mechanical-electrical transducer assemblies, each embodying a pair of record engaging styli which accomplish the objects initially set out. In our embodiment, the apparatus of the invention is simple in design, durable in operation, and capable of being economically produced. Through employment of the principles of the invention we are enabled to readily provide a single arm and transducer cartridge assembly for operation with either records of different types or with automatic record players of varying characteristics.

The above specifically described embodiment of the invention should be considered as illustrative only as obviously many changes may be made therein without departing from the spirit or scope of the invention. Reference should therefore be had to the appended claims in determining the scope of the invention.

We claim:

1. In a phonograph pick-up, an arm, a flat elongated fitting secured to the outer end of said arm, said fitting having a bifurcated outer end and having a longitudinally extending groove in the inner surface of each of the bifurcations, a cartridge mounting a mechanical-electrical transducer and a pair of record engaging styli slideably received in said grooves, quick-detachable electrical connector components mounted in said fitting at the base of said bifurcations and on said cartridge whereby a connecting circuit is automatically established upon insertion of said cartridge in said fitting, said styli projecting out of said cartridge in opposite directions and said cartridge being insertible in said fitting in either one of two orientations whereby either stylus may be employed to engage a record positioned below said arm and fitting.

2. Apparatus according to claim 1 further characterized in that said cartridge is widened at a point intermediate its ends whereby said cartridge is frictionally and tightly retained in said grooves.

3. Apparatus according to claim 1 further including friction means to retain said cartridge in operative position within said bifurcations.

4. In a phonograph pick-up having a mechanical-electrical transducer, a casing for said transducer, a driving member pivotally mounted in said casing and connected with said transducer, a pair of oppositely disposed record grove engaging styli rigidly connected to said driving member and extending outwardly of said casing, a supporting arm having an open free end and having a socket extending rearwardly from said end to slidably receive and retain said casing, said casing being insertable in said socket in either of two orientations whereby one or the other of said styli are presented for engagement by a record disc, means in said socket cooperating with means on said casing to restrain rotation of said casing about the pivotal axis of said driving member, said axis being generally parallel with the direction of sliding movement of said casing into and out of said arm, a pair of electrical connectors mounted on said casing in symmetrical relation about said axis and electrically connected with said transducer, and a pair of cooperating electrical connectors mounted in said arm and adapted to be engaged by said first mentioned electrical connectors upon said casing being inserted in said arm in either of said two orientations.

5. Apparatus according to claim 4 further characterized in that said casing comprises upper and lower sections, only one of which is normally visible from a single upper viewing position when said cartridge is inserted in said socket, said casing sections each bearing distinctive indicia to indicate to the user the orientation of said casing in said socket.

6. In a phonograph pick-up having a mechanical-electrical transducer, a casing for said transducer, a driving member pivotally mounted in said casing and connected with said transducer, a pair of oppositely disposed record groove engaging styli rigidly connected to said driving member and extending outwardly of said casing, a supporting arm having an open free end and having a socket extending rearwardly from said end to slidably receive and retain said casing, said socket having an upper wall, an opening in said wall exposing an upper surface of said casing upon said casing being inserted in said socket, means in said socket cooperating with means on said casing to restrain rotation of said casing about the pivotal axis of said driving member, said axis being generally parallel with the direction of sliding movement of said casing into and out of said arm, a pair of electrical connectors mounted on said casing in symmetrical relation about said axis and electrically connected with said transducer, and a pair of cooperating electrical connectors mounted in said arm and adapted to be engaged by said first mentioned electrical connectors upon said casing being inserted in said arm.

7. In a phonograph pick-up having a mechanical-electrical transducer, a casing for said transducer, a driving member pivotally mounted in said casing and connected with said transducer, a pair of oppositely disposed record groove engaging styli rigidly connected to said driving member and extending outwardly of said casing, a supporting arm having an open free end and having a socket extending rearwardly from said end to slidably receive and retain said casing, said casing being insertable in said socket in either one of two orientations whereby one or the other of said styli is exposed for engagement with a record disc, means in said socket cooperating with means on said casing to restrain rotation of said casing about the pivotal axis of said driving member, said axis being generally parallel with the direction of sliding movement of said casing into and out of said arm, means carried by said arm to yieldably restrain movement of the stylus which is not exposed as aforesaid, a pair of electrical connectors mounted on said casing in symmetrical relation about said axis and electrically connected with said transducer, and a pair of cooperating electrical connectors mounted in said arm and adapted to be engaged by said first mentioned electrical connectors upon said casing being inserted in said arm.

BELFORD C. ANGLE.
MAURICE M. PALO.
PAUL VINCENT KELLY.

REFERENCES CITED

The following references are of record in the file of this patent:

UNITED STATES PATENTS

| Number | Name | Date |
|---|---|---|
| 1,503,854 | Seelau | Aug. 5, 1924 |
| 1,830,801 | McClatchie | Nov. 10, 1931 |
| 1,992,893 | Thomas | Feb. 26, 1935 |
| 2,087,135 | Wielage | July 13, 1937 |
| 2,295,712 | Brown | Sept. 15, 1942 |
| 2,318,308 | Harris | May 4, 1943 |
| 2,320,427 | Guedon | June 1, 1943 |
| 2,479,894 | Andrews | Aug. 23, 1949 |
| 2,489,379 | Kalmus | Nov. 29, 1949 |